(12) United States Patent
Jandric et al.

(10) Patent No.: US 9,911,441 B1
(45) Date of Patent: Mar. 6, 2018

(54) MAGNETIC RECORDING APPARATUS HAVING THERMAL SENSOR AND A SOLID-IMMERSION MIRROR

(71) Applicant: Seagate Technology LLC, Cupertino, CA (US)

(72) Inventors: Zoran Jandric, St. Louis Park, MN (US); Martin Blaber, Plymouth, MN (US); Chubing Peng, Eden Prairie, MN (US); John Charles Duda, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/381,015

(22) Filed: Dec. 15, 2016

(51) Int. Cl.
*G11B 11/00* (2006.01)
*G11B 5/48* (2006.01)
*G11B 5/00* (2006.01)
*G11B 11/105* (2006.01)
*G11B 7/126* (2012.01)

(52) U.S. Cl.
CPC ............ *G11B 5/4866* (2013.01); *G11B 7/126* (2013.01); *G11B 11/1051* (2013.01); *G11B 11/10506* (2013.01); *G11B 2005/0021* (2013.01)

(58) Field of Classification Search
None
See application file for complete search history.

(56) References Cited

U.S. PATENT DOCUMENTS

| 8,908,483 | B1 | 12/2014 | Ren et al. | |
|---|---|---|---|---|
| 9,177,577 | B2 | 11/2015 | Macken et al. | |
| 2011/0228651 | A1* | 9/2011 | Gage | G11B 5/314 369/13.24 |
| 2013/0286802 | A1* | 10/2013 | Kiely | G11B 13/04 369/13.31 |
| 2013/0286805 | A1* | 10/2013 | Macken | G11B 5/314 369/13.33 |
| 2014/0269238 | A1* | 9/2014 | Kautzky | G11B 5/3133 369/13.33 |
| 2014/0269819 | A1* | 9/2014 | Kiely | G11B 5/3116 369/13.33 |
| 2015/0036469 | A1* | 2/2015 | Johnson | G11B 13/08 369/13.33 |
| 2015/0085630 | A1* | 3/2015 | MacKen | G11B 5/314 369/13.33 |

* cited by examiner

*Primary Examiner* — Tan X Dinh
(74) *Attorney, Agent, or Firm* — Holingsworth Davis, LLC

(57) ABSTRACT

A solid-immersion mirror has two reflective portions surrounding a focal region. A thermal sensor that senses temperature as a function of resistance is proximate at least one of the two reflective portions of the solid-immersion mirror. A near-field transducer is located proximate the focal region of the solid-immersion mirror. The near-field transducer directs optical energy to a magnetic recording medium.

19 Claims, 4 Drawing Sheets

MAGNETIC RECORDING APPARATUS HAVING THERMAL SENSOR AND A SOLID-IMMERSION MIRROR

SUMMARY

The present disclosure is directed to a thermal sensor located proximate a solid-immersion mirror. In one embodiment, apparatus, an apparatus has an optical coupling path that receives light energy from an energy source. A solid-immersion mirror is configured to reflect the light energy from the optical coupling path to a focal region. The solid-immersion mirror has two reflective portions surrounding the focal region. A thermal sensor that senses temperature as a function of resistance is proximate at least one of the two reflective portions of the solid-immersion mirror. A near-field transducer is located proximate the focal region of the solid-immersion mirror. The near-field transducer directs the light energy to a magnetic recording medium via a media-facing surface of the apparatus.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, information bits are recorded in a storage layer of a recording medium (e.g., magnetic disk) at elevated temperatures. The heated area (e.g., hot spot) in the storage layer determines the data bit dimension. One way to achieve a tiny, confined hot spot is to use a recording head with an optical near-field transducer (NFT), such as a plasmonic optical antenna or an aperture, integrated in an optical waveguide of high contrast in the index of refraction between the waveguide core and its claddings. A magnetic write pole is placed in close proximity (e.g., 20-50 nm) to the NFT at the media-facing surface of the recording head.

In the following disclosure, apparatuses (e.g., HAMR read/write heads) are described with sensors that can be implemented inexpensively and reliably. For example, while any number of sensors can theoretically be integrated into a read/write head, there is only a limited amount of space available for the attachment of electrical leads that allow controlling/reading sensors. Further, the read/write heads are typically built using wafer manufacturing techniques where all components are deposited as layers and shaped using techniques such as photolithography and mechanical planarization. Increasing the number of functional components on the read/write head increases the number of process steps needed to build the head.

In embodiments described below, a thermal sensor is placed proximate a solid-immersion mirror (SIM). Generally, a SIM is located proximate an NFT and used to focus light from the delivery waveguide to the NFT. For example, the SIM may have a parabolic shape and the NFT is located in a focus of the parabola. A SIM is formed by etching the desired reflector shape in a substrate and then coating the etched regions with a reflective material. As will be described below, a SIM can be formed that is optimized for both focusing and for use with a proximate thermal sensor, also sometimes referred as SIM sensor.

Solid-immersion mirror sensors described herein can be used to detect local temperature near the NFT. The temperature readings can be used to estimate power applied via a HAMR laser, e.g., acting as a bolometer. The temperature sensor can also be used to detect clearances between the head and recording medium, e.g., in response to thermal protrusion induced by a clearance heater. The sensors can utilize thin films of material with a known thermal coefficient of resistance (TCR). The sensors exhibit a change in resistance in response to a change in temperature. A signal is applied to the sensor and the response analyzed to determine a resistance of the sensor (or change thereof), and thereby determine the temperature (or change thereof).

Figure 1:
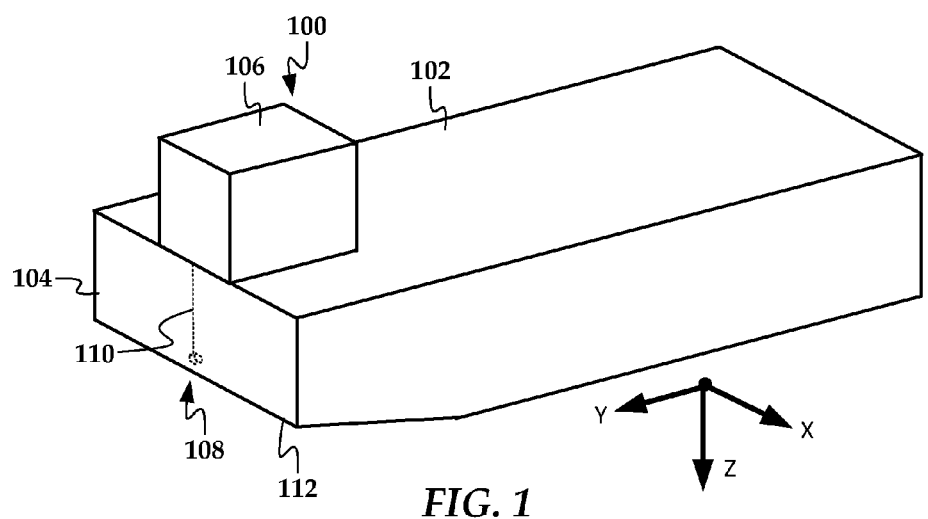
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 102 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode) and a waveguide 110. The waveguide 110 delivers electromagnetic energy from the energy source 106 to an NFT that is part of the read/write transducers 108. The NFT achieves surface plasmon resonance and directs the energy out of a media-facing surface 112 to create a small hot spot on the recording medium.

Figure 2:
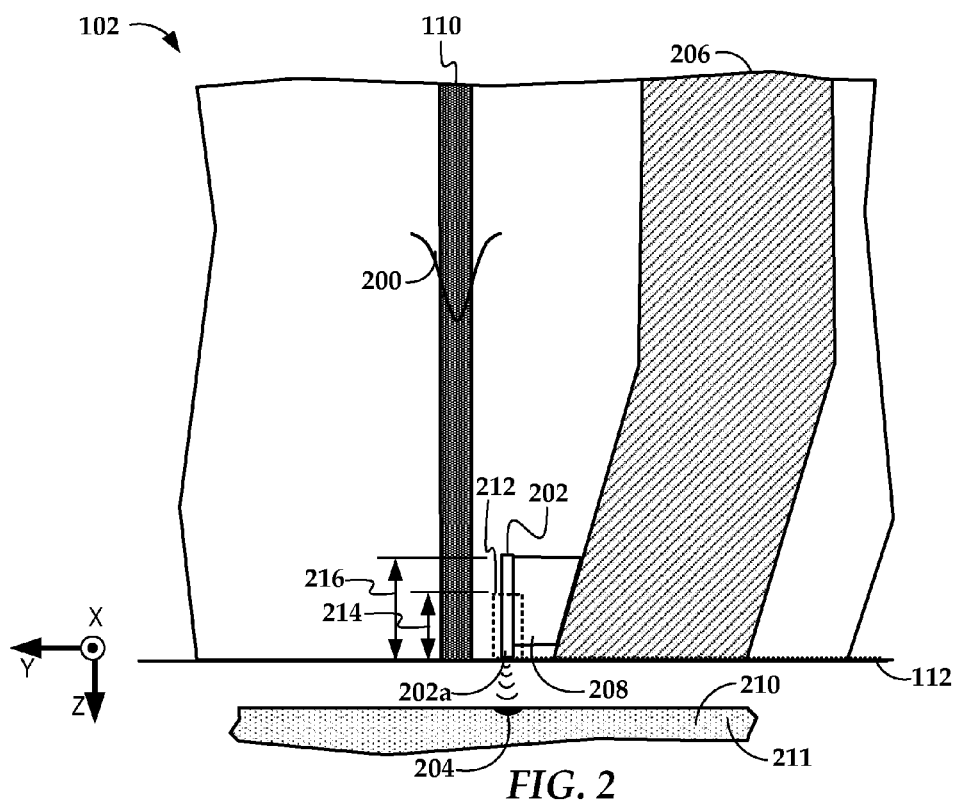
FIG. 2 is a cross-sectional view of a slider according to according to an example embodiment.

As shown in FIG. 2, the waveguide 110 receives electromagnetic energy 200 from the energy source, the energy being coupled to NFT 202. The NFT 202 is made of a metal (e.g., gold, silver, copper, etc.) that achieves surface plasmonic resonance in response to the applied energy 200. The NFT 202 shapes and transmits the energy via a peg 202a to create a small hotspot 204 on a surface 210 of a recording medium 211. A magnetic write pole 206 causes changes in magnetic flux near the media-facing surface 112 in response to an applied current. Flux from the write pole 206 changes a magnetic orientation of the hotspot 204 as it moves past the write pole 206 in the down-track direction (y-direction). A heat sink 208 thermally couples the NFT 202 to the write pole 206.

A SIM 212 is shown proximate the NFT 202. The SIM 212 is configured to reflect the energy from the optical coupling path 110 to a focal region. Note that in this configuration, the SIM 212 extends a distance 214 away from the media-surface 112 that is shorter than a corresponding distance 216 of the near-field transducer. This helps minimize impact of the SIM 212 on the waveguide mode-NFT coupling. This may result in the SIM 212 having a z-dimension less than one wavelength of the applied light, and may be referred to herein as a sub-wavelength focusing mirror. Further details of a submicron focusing mirror can be found in U.S. Provisional Patent Application 62/301,028 filed Feb. 29, 2016. It will be understood that the concepts described herein may be applicable to any size or shape of solid-immersion mirror, and not just the illustrated sub-wavelength mirror embodiments.

Figure 3:
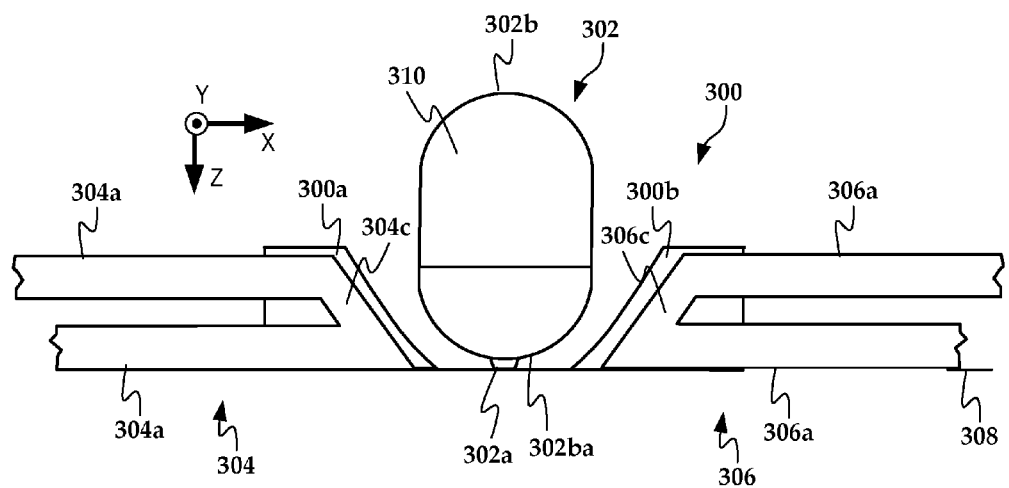
FIG. 3 is a plan view of a thermal sensor, solid-immersion mirror and near-field transducer according to an example embodiment.

In FIG. 3, a plan view shows a SIM 300 according to an example embodiment. This view is taken from a substrate-parallel plane, which corresponds to an xz-plane using the illustrated coordinate systems shown in FIGS. 1-3. The SIM 300 includes two reflective portions 300a-b that focus light to an NFT 302. The NFT 302 includes an enlarged portion 302b and a peg 302a extending from the enlarged portion 302b towards a media-facing surface 308. An optical coupling path (e.g., waveguide) delivers energy to the SIM 300, which reflects the energy from the optical coupling path to the NTT 302 which is at or near a focal region defined by the shape of reflective surfaces 300a-b. The NFT 302 achieves surface plasmon resonance in response to the reflected/focused energy, and directs the energy to a magnetic recording medium via the media-facing surface 308.

A pair of thermal sensors 304, 306 are located proximate (e.g., layered directly over) the portions 300a-b of the SIM 300. The sensors include conductors 304a-b, 306a-b can be used to pass a current through a sensor element 306c. The sensor elements 304c, 306c are thermally coupled to the reflective portions 300a-b of the SIM 300 are also coated with this reflective material. By passing a current through the conductors 304a-b, 306a-b, a controller can sense temperature near the SIM 300 as a function of resistance of the sensor elements 304c, 306c. The resistance of the sensor elements 304c, 306c is a function of at least the dimensions and materials used, as well as temperature of the layer.

In one configuration, the enlarged portion 302b of the NFT 302 is made of a material such as Au with good plasmonic resonance properties. The peg 302a may be made of the same material or of a different material. For example, the peg 302a may be made from a thermally robust material such as Rh. This can improve long-term reliability of the NFT 302. A heat sink 310 may be built on top of the enlarged portion 302b extending away from the NFT 302 in the y-direction. The heat sink 310 can draw heat away from the NFT 302 to a thermal sink, e.g., a write pole (see FIGS. 2 and 4).

The reflective covering (e.g., Au) of the SIM portions 300a-b may have different thicknesses 410, 412 to improve performance. For example, the thickness 410 of the reflective film may be less (e.g., <50 nm) near the NFT 302 to optimize and control optical losses. Further from NFT 302, the thickness 412 of the reflective film can be >50 nm to prevent optical absorption and/or minimize resistance of the sensors 304, 306. The sensors 304, 306 may also be at least partially covered with a reflective covering (e.g., Au). For example, conductors 304a, 306a that are away from the media-facing surface 308 may be covered with reflective material.

Note that although two sensors 304, 306 are shown in FIG. 3, only one may be used. Generally, use of two sensors results in symmetry in temperature and thermal protrusion on either cross-track side of the NET 302. The sensors 304, 306 may be wired separately, e.g., via a common ground and two signal wires coupled to the system control board. In other embodiments, the sensors 304, 306 may be wired in series or parallel, therefore only requiring a single pair of signal wires between the head and control board.

Figure 4:
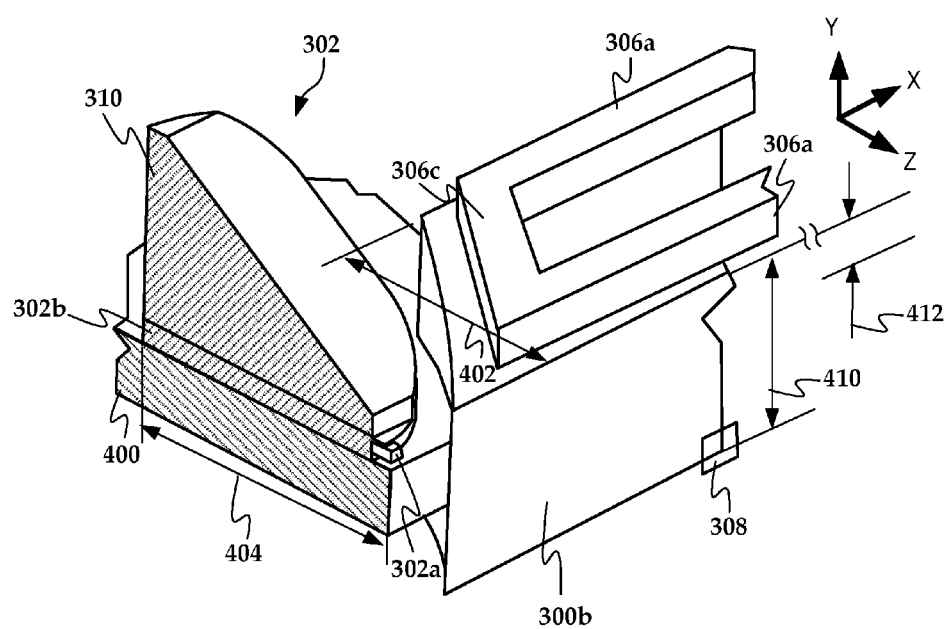
FIG. 4 is a perspective cutaway view of a thermal sensor, solid-immersion mirror and near-field transducer according to an example embodiment.

In FIG. 4, a perspective cutaway view shows additional details of the SIM 300. This view is cut along a yz-plane aligned with a centerline of the NFT 300. A waveguide core 400 can be seen underneath the NFT 302. The regions above and below the core 400 are covered with a cladding material (not shown) having a different refractive index than that of the core 400. Both the core 400 and cladding of the waveguide may be formed of dielectric materials. The waveguide couples light to the NFT 302 in a $TE_{10}$ mode. Between the NFT 302 and the laser diode, the light path may include a mode converter to convert a fundamental mode output (e.g., $TE_{00}$) of the laser diode to the higher-order $TE_{10}$ mode.

As seen in this view, the reflective surfaces, e.g., surface 300b, extend into the core 400, as well as extending into the cladding material above and below the core in the y-direction. The SIM 300 may be configured as a parabolic mirror that is submicron size, which minimizes disturbance to $TE_{10}$ mode coupling between the waveguide and NFT 302 and uses uncoupled energy to improve the longitudinal field for peg excitation. As such, the SIM extends a first distance 402 away from the media-facing surface 308 that is less than a corresponding distance 404 of the NET 302. For example, as best seen in FIG. 3, the reflective surfaces 302a-b overlap a curved end 302ba of the enlarged portion 302b, and may overlap a small part of the straight sides of the enlarged portion 302b.

The close distance between the SIM 300, thermal sensor and the NET 302 results in improved accuracy in the temperature measurements. Further, the SIM 300 is at a region on the media facing surface 308 that experiences maximum thermal protrusion due to the conversion of optical and electrical energy into heat in vicinity of the write transducer. This protrusion includes a narrow, laser-induced protrusion that results when the laser is providing energy to the NFT 302. The device will also experience a broad, laser-induced protrusion that results from heating of the surrounding area and may include contributions from other heat sources, e.g., write pole, clearance control heaters, etc. As a result, the thermal sensors 304, 306 are responsive to these protrusions, which is useful for applications such as dynamic fly-height control.

Figure 5:
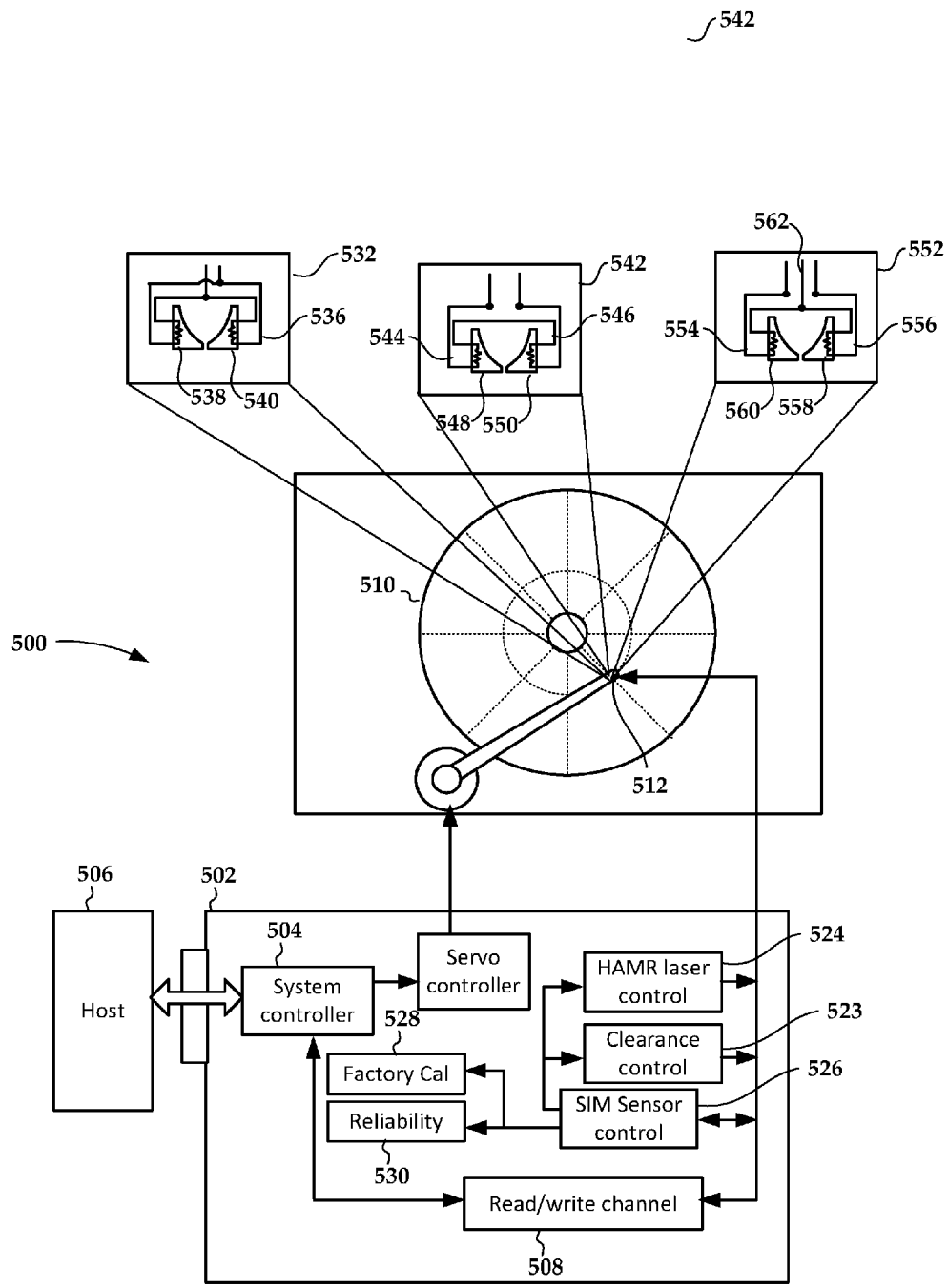
FIG. 5 is a block diagram of an apparatus according to an example embodiment.

In FIG. 5, a block diagram illustrates a data storage apparatus 500 according to an example embodiment. Control circuits 502 of the apparatus 500 include a system controller 504 that processes read and write commands and associated data from a host device 506. The system controller 504 is coupled to one or more read/write channels 508 that read from and writes to a surface of a magnetic disk 510 via one or more read/write heads 512 during read operations. The read/write channel 508 may also process other signals sent to and received from the read/write heads, e.g., sensor signals, clearance control signals, etc. To facilitate these operations, the read/write channel 508 may include analog and digital circuitry such as amplifiers, preamplifiers, filters, decoders, digital-to-analog converters, timing-correction units, etc.

A clearance control module 523 provides control of a clearance between the read/write heads 512 and the disk 510. Generally, the read/write heads include air-bearing features on the media-facing surface that cause the read/write heads to ride on a thin layer of air on the surface of the disk 510. This provides a relatively fixed amount of separation between the heads and disk, and the read/write heads 512 may include active components to dynamically control a clearance between read/write transducers and the disk surface. For example, the read/write heads 512 may each include one or more heaters that cause a thermal protrusion near the read and write transducers of the heads 512. By changing a current supplied to the heaters via control module 523, clearance between the transducers and disks can be finely controlled.

The disk drive 500 uses HAMR, and therefore the read/write heads 512 include an energy source (e.g., laser diode) that heats the magnetic disk 510 when recording. A HAMR laser control block 523 sends a current to bias the laser when not recording and to activate the lasers during recording. The read/write heads 512 include a SIM that focuses energy from the laser onto an integrated NFT when writing to the disk. The NFT directs the focused energy out of the read/write head 512 to create a small hotspot in the disk 510.

Co-located with each SIM is a SIM sensor that is used to locally sense temperature. The SIM sensor includes electrical leads that are coupled to the logic circuitry 302, e.g., via the one or more read/write channels 508. A SIM sensor control module 526 provides a signal to the SIM sensor and thereby determines a change in resistance of the SIM sensor, e.g., by determining a relationship between voltage and current of the signal. The SIM sensor control module 526 uses the change in resistance to detect thermally-related phenomena affecting the read/write heads 512. For example, the temperature change detected by the SIM sensor control module 526 can be used to detect clearance and/or contact between the read/write heads 512, which can be used by clearance control module 523. The SIM sensor control module 526 can also be used to determine/estimate an amount of laser power being applied to the disk 510 via the laser, as well as change in the laser diode power output over the time. This can be used by the laser control module 524 for adjusting bias signals, adjusting activation current, etc.

The SIM sensor control module 526 can be used for purposes besides control/adjustment of read/write heads 512 during. For example, as indicated by factory calibration module 528, the SIM sensor can be used for determining alignment between the laser and the integrated optics of the read/write heads 512 before being attached together in the factory. In such an application, the read/write heads 512 would most likely not be part of a disk drive as shown, although the circuitry used to perform alignment functions may have functionality corresponding to that of illustrated circuitry 502.

Another use of the SIM sensor control module 526 is for determining long-term wear/reliability of the integrated optical components of the read/write heads 512. This is indicated in the figure by reliability module 530. Generally, high temperatures and other events (e.g., head-to-disk contact) can be indicators of wear of the NFT and other components. Because the SIM sensor is closely positioned to the NFT at a region that experiences these high-temperatures, the SIM sensor may be able to provide accurate historical temperature data useful in tracking and predicting long-term reliability of the read/write heads 512.

As noted above, two SIM sensors may be located on corresponding reflective portions of the SIM, the reflective portions being located on either side of the NFT. The SIM sensors may be wired together in parallel as seen in detail view 532, which shows SIM sensors 534, 536 located proximate SIM portions 538, 540. Alternatively, as seen in detail view 542, SIM sensors 544, 546 located proximate SIM portions 548, 550 may be wired in series. In yet another embodiment as seen in detail view 552, SIM sensors 554, 556 located proximate SIM portions 558, 560 may be wired separately, in this case using a common return line 562. Two separate return lines may be used instead of common return line 562.

Figure 6:
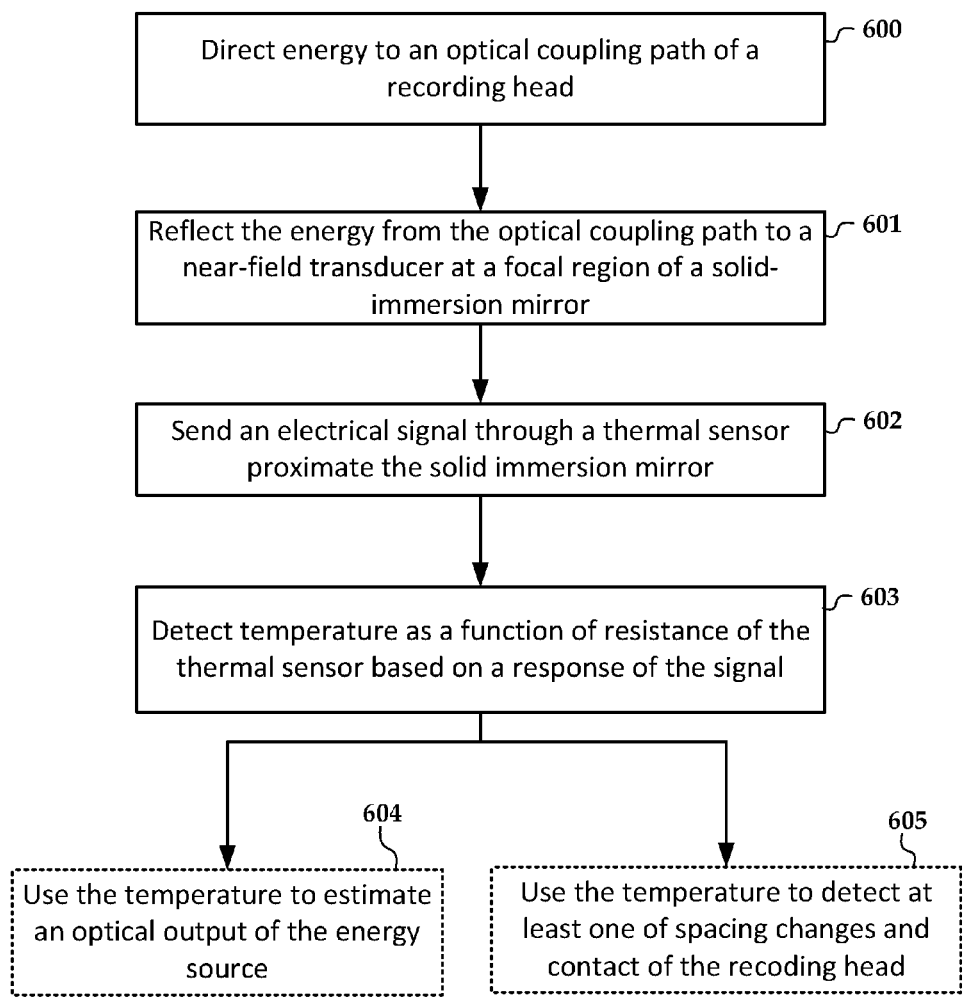
FIG. 6 is a flowchart of a method according to an example embodiment.

In FIG. 6, a flowchart shows a method according to an example embodiment. The method involves directing 600 energy from an optical energy source to an optical coupling path of a recording head. The energy from the optical coupling path is reflected 601 to a near-field transducer located at a focal region of a solid-immersion mirror. The near-field transducer directs the energy to a magnetic recording medium via a media-facing surface of the recording head. An electrical signal is sent 602 through the SIM sensor. Temperature is detected 603 as a function of resistance of the SIM sensor, based on a change of the signal. For example, a constant voltage source may apply DC or AC signal to the SIM sensor, and resistance determined based on the amount of current of the signal. Conversely, a constant current source may apply DC or AC signal to the SIM sensor, and resistance determined based on the voltage of the signal.

The temperature detected at block 603 may optionally be used to detect 604 at least one of spacing changes and contact between the recording head and the magnetic recording medium. Instead or in addition, temperature detected at block 603 may optionally be used to detect 605 an optical output of the energy source. This detection 602 may be used to adjust operation of the energy source during use and/or to align the energy source to the apparatus during a factory process.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
   an optical coupling path that receives light energy from an energy source;
   a solid-immersion mirror configured to reflect the light energy from the optical coupling path to a focal region, the solid-immersion mirror comprising two reflective portions surrounding the focal region;

a thermal sensor that senses temperature as a function of resistance, the thermal sensor layered directly over at least one of the two reflective portions of the solid-immersion mirror; and a near-field transducer located proximate the focal region of the solid-immersion mirror, the near-field transducer directing the light energy to a magnetic recording medium via a media-facing surface of the apparatus.

2. The apparatus of claim 1, further comprising a second thermal sensor layered directly over the other reflective portion of the solid-immersion mirror.

3. The apparatus of claim 2, wherein the thermal sensor and the second thermal sensor are wired together in parallel or in series.

4. The apparatus of claim 1, wherein the solid-immersion mirror comprises a film of reflective material, the film having a first thickness proximate the near-field transducer and a second thickness away from the near-field transducer, the second thickness being greater than the first thickness.

5. The apparatus of claim 1, wherein a change in the temperature is used to detect at least one of spacing changes and contact between the apparatus and the magnetic recording medium.

6. The apparatus of claim 1, wherein a change in the temperature is used to adjust operation of the energy source during use.

7. The apparatus of claim 1, wherein a change the temperature is used to align the energy source to the apparatus during a factory process.

8. The apparatus of claim 1, wherein the optical coupling path comprises a waveguide that overlaps and delivers light to the near-field transducer, solid-immersion mirror being located at an end of the waveguide proximate the media-facing surface.

9. The apparatus of claim 1, wherein the near-field transducer extends a first distance away from the media-surface and the solid-immersion mirror extends a second distance away from the media-surface, the second distance being less than the first distance.

10. The apparatus of claim 1, wherein the optical coupling path comprises a waveguide core and waveguide cladding, wherein the solid-immersion mirror is etched through at least the waveguide core.

11. A method comprising:
directing energy from a light source to an optical coupling path of a recording head;
reflecting the energy from the optical coupling path to a near-field transducer located at a focal region of a solid-immersion mirror, the near-field transducer directing the energy to a magnetic recording medium via a media-facing surface of the recording head;

sending an electrical signal through a thermal sensor layered directly over the solid-immersion mirror; and detecting temperature as a function of resistance of the thermal sensor based on a response of the signal.

12. The method of claim 11, further comprising using the temperature to detect at least one of spacing changes and contact between the recording head and the magnetic recording medium.

13. The method of claim 11, further comprising using a change in the temperature to adjust operation of the light source during use.

14. The method of claim 11, further comprising using a change in the temperature to align the light source to the apparatus during a factory process.

15. A system comprising:
a recording head comprising:
a laser;
a waveguide system optically coupled to the laser;
a solid-immersion mirror at an end of the waveguide, the solid-immersion mirror comprising two reflective portions surrounding a focal region;
a thermal sensor that senses temperature as a function of resistance, the thermal sensor layered directly over at least one of the two reflective portions of the solid-immersion mirror; and
a heater configured to affect a clearance between the recording head and the recording medium; and
a circuit coupled to the recording head; the circuit configured to:
pass a current through the thermal sensor;
based on the current, determine a resistance of the thermal sensor; and
based on the resistance, actively control a power level of at least one of the laser and the heater.

16. The system of claim 15, further comprising a second thermal sensor layered directly over the other reflective portion of the solid-immersion mirror, the circuit further configured to pass a second current through the second thermal sensor and determine a second resistance in response thereto, the controlling of the power level using both the resistance and the second resistance.

17. The system of claim 16, wherein the thermal sensor and the second thermal sensor are wired together in parallel or in series.

18. The system of claim 15, wherein the solid-immersion mirror comprises a film of reflective material, the film having a first thickness proximate the near-field transducer and a second thickness away from the near-field transducer, the second thickness being greater than the first thickness.

19. The system of claim 15, wherein at least part of the thermal sensor away from a media-facing surface of the recording head is coated with reflective material.

* * * * *